US009575855B2

United States Patent
Maeda et al.

(10) Patent No.: US 9,575,855 B2
(45) Date of Patent: Feb. 21, 2017

(54) STORAGE APPARATUS AND FAILURE LOCATION IDENTIFYING METHOD

(71) Applicant: Hitachi, Ltd, Tokyo (JP)

(72) Inventors: Toru Maeda, Tokyo (JP); Ryosuke Matsubara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 343 days.

(21) Appl. No.: 14/357,499

(22) PCT Filed: Sep. 6, 2013

(86) PCT No.: PCT/JP2013/074064
§ 371 (c)(1),
(2) Date: May 9, 2014

(87) PCT Pub. No.: WO2015/033433
PCT Pub. Date: Mar. 12, 2015

(65) Prior Publication Data
US 2016/0179641 A1     Jun. 23, 2016

(51) Int. Cl.
| G06F 11/00 | (2006.01) |
| G06F 11/20 | (2006.01) |
| G06F 13/00 | (2006.01) |
| G06F 13/10 | (2006.01) |
| G06F 11/07 | (2006.01) |

(52) U.S. Cl.
CPC ........... *G06F 11/2017* (2013.01); *G06F 11/07* (2013.01); *G06F 13/00* (2013.01); *G06F 13/10* (2013.01); *G06F 2201/805* (2013.01)

(58) Field of Classification Search
CPC .............................. G06F 11/2017; G06F 11/07

USPC .................................... 714/6.3, 6.32, 10–13
See application file for complete search history.

(56) References Cited

U.S. PATENT DOCUMENTS

| 2006/0277354 A1* | 12/2006 | Tomii ................... G06F 11/2089 711/4 |
| 2008/0126581 A1 | 5/2008 | Komikado et al. |
| 2009/0006890 A1* | 1/2009 | Takada ................ G06F 11/0727 714/5.11 |

FOREIGN PATENT DOCUMENTS

| JP | 08-202573 A | 8/1996 |
| JP | 2006-343822 A | 12/2006 |
| JP | 2008-134775 A | 6/2008 |
| JP | 2009-009200 A | 1/2009 |

* cited by examiner

*Primary Examiner* — Dieu-Minh Le
(74) *Attorney, Agent, or Firm* — Volpe and Koenig, P.C.

(57) ABSTRACT

A storage apparatus has a redundant configuration equipped with a plurality of components and includes a first controller and second controller, wherein the first controller is provided with a first processor and a third processor for monitoring the first controller; wherein the second controller is provided with a second processor and a fourth processor for monitoring the second controller; wherein the first processor and the second processor are connected via a first path and the third processor and the fourth processor are connected via a second path; and wherein if a failure occurs at the first controller, the second processor blocks the first path, acquires failure information including a failure location of the first controller via the third processor, the fourth processor, and the second path, executes first failure location identifying processing, and notifies a management terminal of the failure location.

8 Claims, 10 Drawing Sheets

| ACQUIRED INFORMATION | bit[31:24] | bit[23:16] | bit[15:8] | bit[7:0] |
|---|---|---|---|---|
| ERROR CONTENT | CPU INTERNAL ERROR | PCIE PORT ERROR | MEMORY ERROR | |
| ERROR LOCATION | VARIOUS CPU INTERNAL ERRORS CORRESPOND TO BIT [31:24] | PCIE PORT CORRESPONDS TO BIT [23:16] | MEMORY SLOT CORRESPONDS TO BIT [15:0] | |

610

(B)

| 0x0000_0000 – 0x00FF_FFFF | DUMP DATA OF ERROR REGISTER IN PROCESSOR 16MByte |
|---|---|
| 0x0100_0000 – 0x0200_0000 | DUMP DATA OF ENVIRONMENT INFORMATION 16MByte |

620

STORAGE APPARATUS AND FAILURE LOCATION IDENTIFYING METHOD

TECHNICAL FIELD

The present invention relates to a storage apparatus and a failure location identifying method and is suited for use in a storage apparatus and failure location identifying method for executing failure processing at a plurality of storage apparatuses.

BACKGROUND ART

Conventionally, a storage apparatus is provided with a plurality of controllers and processing on accesses from a host computer is distributed among the plurality of controllers (for example, Patent Literature 1). If a failure occurs at one of the controllers in such a storage apparatus, the other controller where the failure has not occurred will process accesses from a host computer collectively. When this happens, the controller where the failure has occurred executes processing for identifying a failure location and notifies a user of the failure location.

CITATION LIST

Patent Literature

[Patent Literature 1] Japanese Patent Application Laid-Open (Kokai) Publication No. 2008-134775

SUMMARY OF INVENTION

Problems to be Solved by the Invention

Under this circumstance, failure processing of the controller where the failure has occurred is executed by a processor in that controller; however, the failure might have occurred in that processor itself. Furthermore, even if the failure occurrence location is a component, such as a memory, other than the processor in the controller, there is a possibility that the processor might not operate normally due to the influence of the failure of that component. The problem in such a case is that when the controller where the failure has occurred fails to execute the processing normally for identifying the failure location and even if the failure has occurred only at some component, the entire controller has to be replaced and it takes long time and cost much to recover from the failure.

The present invention was devised in consideration of the above circumstances and aims at suggesting a storage apparatus and failure location identifying method capable of inhibiting the potential of failure propagation upon the occurrence of a failure at the storage apparatus having redundant controllers and identifying a failure location with certainty.

Means for Solving the Problems

In order to solve the above-described problem, provided according to the present invention is a storage apparatus including a first controller and second controller, which have a redundant configuration equipped with a plurality of components, for controlling data input to and output from a storage device, wherein the first controller is provided with a first processor for controlling data input to and output from the storage device and a third processor for monitoring the first controller; wherein the second controller is provided with a second processor for controlling data input to and output from the storage device and a fourth processor for monitoring the second controller; wherein the first processor and the second processor are connected via a first path and the third processor and the fourth processor are connected via a second path; wherein the first processor and the second processor communicate with each other at normal time via the first path in response to a response from a host computer and execute processing for inputting and outputting data to and from the storage device; and wherein if a failure occurs at the first controller, the second processor blocks the first path, acquires failure information including a failure location of the first controller via the third processor, the fourth processor, and the second path, executes first failure location identifying processing, and notifies a management terminal of the failure location.

According to such a configuration in a case where a failure has occurred in the first controller, the second controller where the failure has not occurred blocks the first path connecting the first processor and the second processor, identifies the failure location from the failure information acquired via the third processor, the fourth processor, and the second path, and notifies the management terminal of the failure location. As a result, the second controller which is normal and in which the failure has not occurred can identify the failure location promptly and with certainty by executing the failure identifying processing even if the failure identifying processing may not be executed normally on the first controller 100 side.

Advantageous Effects of Invention

According to the present invention, a failure location can be identified with certainty while inhibiting the potential for propagation of a failure when the failure occurs at a storage apparatus having redundant controllers.

BRIEF DESCRIPTION OF DRAWINGS

FIG. 6 is a chart showing the content of failure information according to the embodiment.

MODE FOR CARRYING OUT THE INVENTION

An embodiment of the present invention will be explained below in detail with reference with drawings.

(1) First Embodiment

(1-1) Outline of this Embodiment

Figure 1:
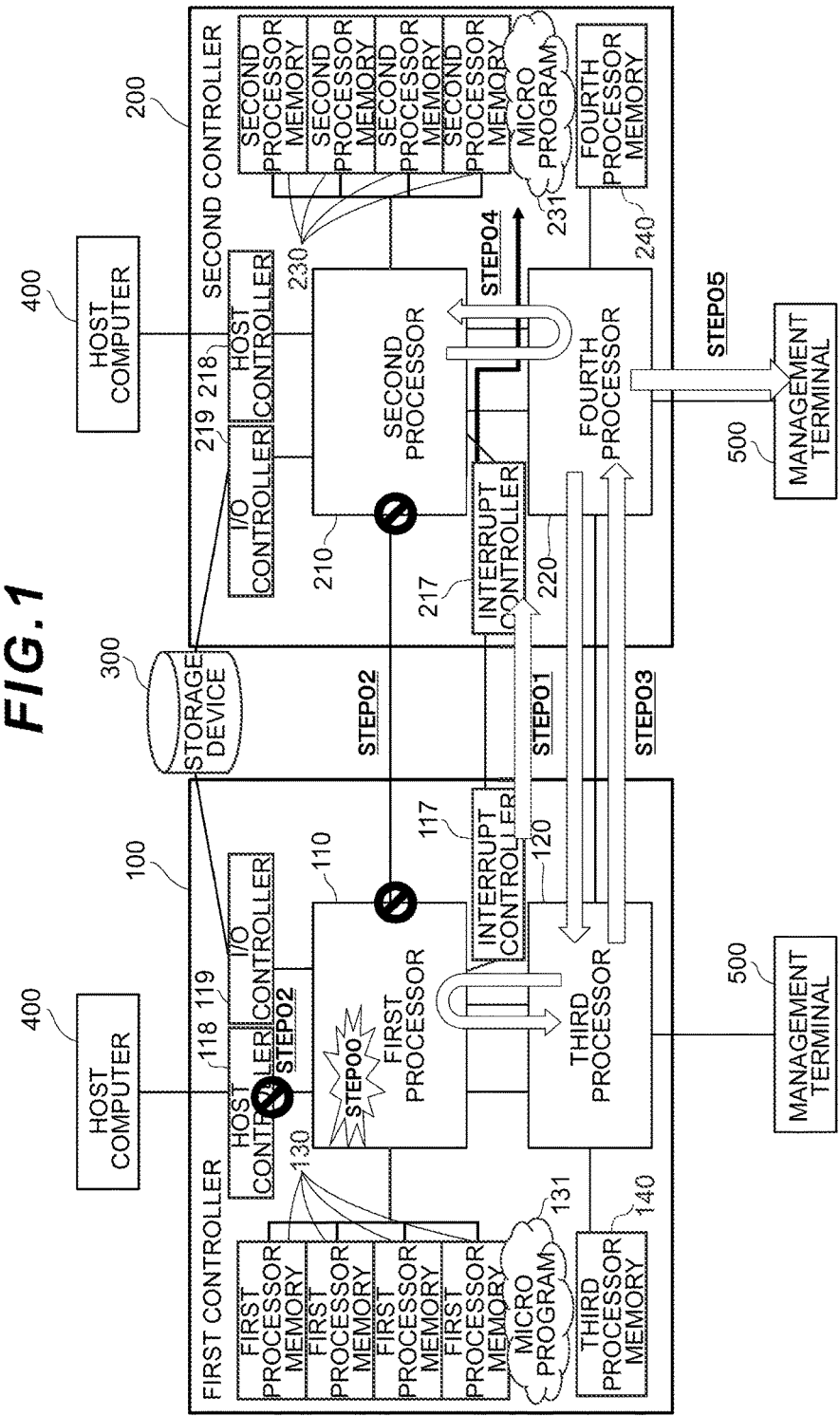
FIG. 1 is a conceptual diagram for explaining the outline of a first embodiment of the present invention.

Firstly, the outline of this embodiment will be explained with reference to FIG. 1. A storage apparatus explained below has a plurality of controllers and each controller is equipped with a plurality of components and has a redundant configuration. Accordingly, processing of accesses from a host computer can be distributed among the plurality of controllers by providing the storage apparatus with the plurality of controllers. Furthermore, if a failure occurs at one controller in such a storage apparatus, the other controller where the failure has not occurred will process accesses from the host computer collectively. When this happens, the controller where the failure has occurred executes processing for identifying a failure location and notifies a user of the failure location.

Under this circumstance, failure processing of the controller where the failure has occurred is executed by a processor in that controller; however, the failure might have occurred in that processor itself. Furthermore, even if the failure occurrence location is a component, such as a memory, other than the processor in the controller, there is a possibility that the processor might not operate normally due to the influence of the failure of that component. The problem in such a case is that when the controller where the failure has occurred fails to execute the processing normally for identifying the failure location and even if the failure has occurred only at some component, the entire controller has to be replaced and it takes long time and cost much to recover from the failure.

Accordingly, this embodiment is designed so that when a failure occurs at the processor or the memory for one controller, the failure location can be identified with certainty by the controller where the failure has not occurred by identifying the failure location and inhibiting the potential of failure propagation upon the occurrence of the failure.

The storage apparatus will be described below as being configured from two controllers, a first controller 100 and a second controller 200, each of which is equipped with a plurality of components and has a redundant configuration. For example, if a failure occurs at a processor or memory for processing access from a host computer 400 in the first controller 100, the second controller 100 in which the failure has not occurred identifies the failure location and notifies a management terminal 500 of the failure location.

The outline of failure location identifying processing will be explained with reference to FIG. 1. If a failure is detected at a first processor 110 for the first controller 100 as illustrated in FIG. 1 (STEP 00), the first controller 100 where the failure has occurred notifies the second controller 200 where the failure has not occurred that the failure has occurred (STEP 01). Specifically speaking, the notice of STEP 01 is sent from an interrupt controller 117 for the first controller 100, which executes failure processing, to an interrupt controller 217 for the second controller 200.

Then, a microprogram 231 for the second controller 200 which has been notified of the failure occurrence disconnects a link to a data path connecting the first controller 100 and the second controller 200 (link-down) and blocks the data path between the first controller 100 and the host computer 400 (STEP 02).

Then, the second controller 200 sends a failure information acquisition request from a fourth processor 220 which is a processor (BMC) for controlling a controller environment, to a third processor 120 which is a BMC of the first controller 100 and acquires failure information inside the first processor 100 from the first controller 100 (STEP 03).

Subsequently, the failure information is reported from the fourth processor 220 to the second processor 210 for the second controller 200 and a microprogram 231 for the second processor 210 analyzes the acquired failure information and identifies the failure location (STEP 04). Then, information about the identified failure location is reported to the management terminal 500 (STEP 05).

For example, if the failure which occurred at the first controller 100 is one which occurred at the first processor 110 itself for the first controller 100 or at a first processor memory 130 in which a microprogram 131 for executing failure processing, there is a high possibility that the failure identifying processing at the first controller 100 cannot be executed normally.

Then, according to this embodiment, the second controller 200 where the failure has not occurred performs the linkdown between the controllers and executes the processing for blocking the path to the host computer 400 in STEP 02. As a result, the possibility to propagate the failure at the first controller 100 to the second controller 200 can be reduced and the failure location can be identified with certainty and reported to the user by executing the failure location identifying processing at the second controller 200, where the failure has not occurred, in STEP 03 and STEP 04.

(1-2) Configuration of Computer System

Figure 2:
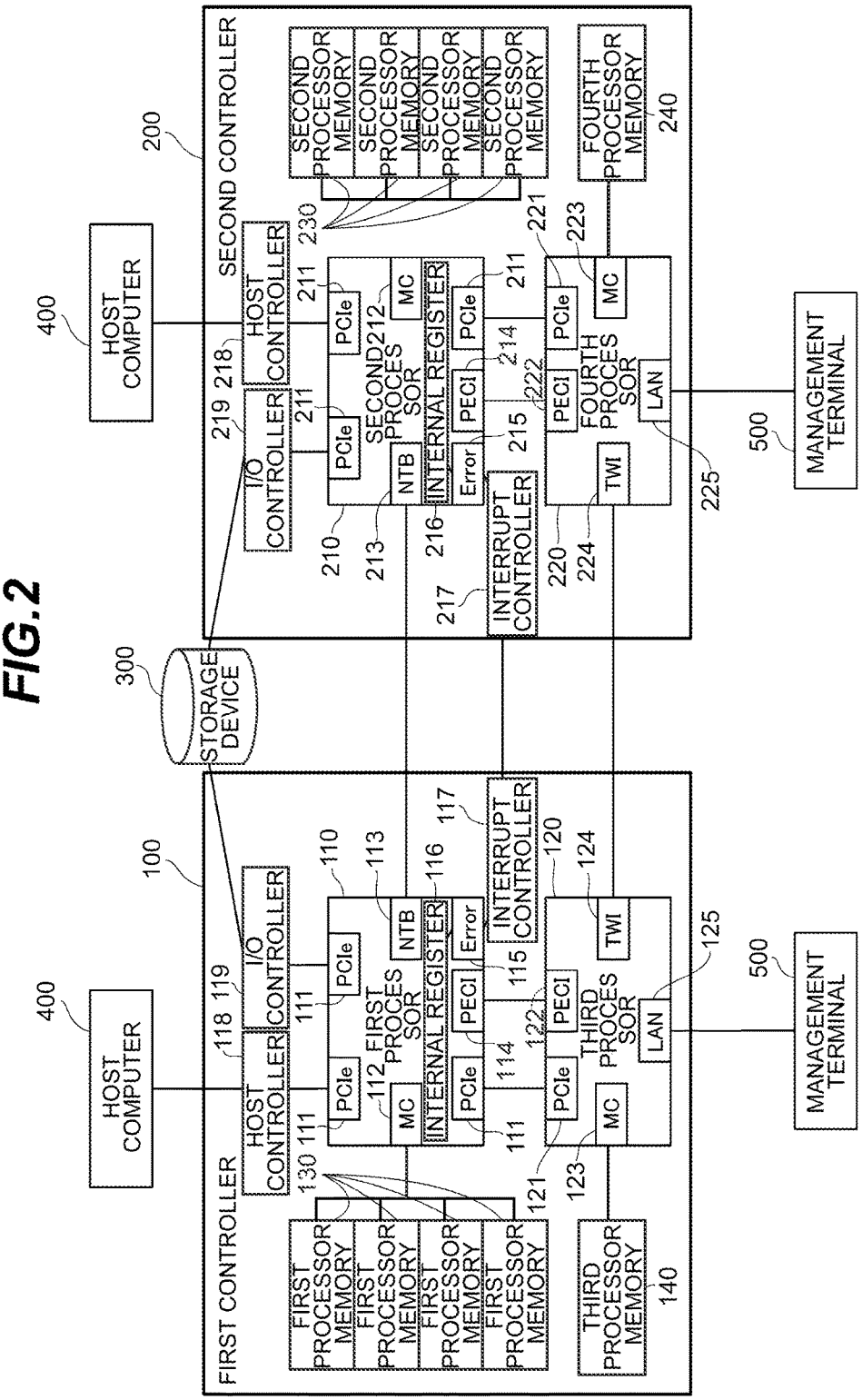
FIG. 2 is a block diagram showing the configuration of a computer system according to the embodiment.

A computer system according to this embodiment includes the first controller 100, the second controller 200, the storage device 300, the host computer 400, and the management terminal 500 as illustrated in FIG. 2.

The first controller 100 and the second controller 200 are information processing units that are provided in the storage apparatus and execute I/O processing on the storage device 300 in response to a request from the host computer 400.

The first controller 100 includes the first processor 110, the interrupt controller 117, a host controller 118, an I/O controller 119, the third processor 120, the first processor memory 130, and a third processor memory 140.

The first processor 110 is a processor for operating the microprogram for controlling the I/O processing of the first controller 100. The first processor 110 connects to various interfaces (I/F) with, for example, the host controller 118 and the I/O controller 119.

Specifically speaking, the first processor 110 includes, for example, a high-speed data path such as a PCIe 111 for connecting to each device, a memory controller (which is indicated as MC in the drawing) 112, a data path such as an NTB 113, a serial interface such as a PECI (Platform Environment Control Interface) 114, and an error register (which is indicated as Error in the drawing) 115.

The PCIe 111 sends and receives data to and from each device by connecting to, for example, the host controller 118 which is an interface for connecting to the host computer 400, the I/O controller 119 which is an interface for connecting to the storage device 300, and the third processor 120.

The memory controller 112 is connected to the first processor memory 130 which is a memory storing the microprogram and data cache operating on the first processor 110. Incidentally, the first controller 100 is equipped with a plurality of first processor memories 130 and is controlled by the first processor 110.

Furthermore, the PECI 114 is connected to a PECI 122 for the third processor 120 and acquires information of the third processor 120. The internal register 116 reflects the outline of error information stored in the internal register 116; and if a failure occurs at any of the first processor 110, the first processor memory 130, or the PCIe 111, the internal register 116 reflects the failure information. Furthermore, the first processor 110 sends, for example, failure information reflected in the error register, to the second controller 200 via the interrupt controller 117. The failure information to be sent to the second controller 200 will be explained later in detail.

The third processor 120 includes a PCIe 121, the PECI 122, a memory controller (which is indicated as MC in the drawing) 123, a TWI (Two-wire Serial Interface) 124, and a LAN (Local Area Network) 125.

The PCIe 121 sends and receives data by connecting to the first processor 110. The PECI 122 acquires information of the internal register 116 for the first processor 110, which is connected to the PECI 114 for the first processor 110. The memory controller 123 is connected to the third processor memory 140 which is a memory storing the microprogram operating on the third processor. Incidentally, the third processor memory 140 is controlled by the third processor 120.

The TWI 124 is a serial communication bus for connecting the third processor 120 and the fourth processor 220 for the second controller 200. The LAN 125 is an interface for LAN communication with the management terminal 500.

Furthermore, the second controller 200 includes the second processor 210, an interrupt controller 217, a host controller 218, an I/O controller 219, the fourth processor 220, a second processor memory 230, and a fourth processor memory 240. Since they have the same hardware configuration as that of the first controller 100, any detailed explanation about them has been omitted.

The storage device 300 is a device that stores data processed by the host computer 400; and the storage device 300 can be, for example, a storage device such as an HDD (Hard Disk Drive) or an SSD (Solid State Drive). Incidentally, FIG. 2 illustrates one storage device 300; however, the invention is not limited to this example and the storage apparatus can be configured so that a plurality of storage devices 300 can be accessed by the first controller 100 and the second controller 200.

The host computer 400 requests the storage apparatus including the first controller 100 and the second controller 200 to read/write data. The host computer 400 is composed of, for example, a general server device and is equipped with information processing resources such as a CPU and a memory. The CPU functions as an arithmetic processing unit and controls the operation of the host computer 400 in accordance with programs and operation parameters stored in the memory.

The management terminal 500 is a terminal for the user to manage the storage apparatus and is used to monitor and maintain the operation of the storage apparatus. The management terminal 500 is equipped with information processing resources such as a CPU and a memory. The CPU functions as an arithmetic processing unit and controls the operation of the management terminal 500 in accordance with, for example, programs and operation parameters stored in the memory. Moreover, the management terminal 500 is equipped with information input devices such as a keyboard, a switch, a pointing device, and a microphone, and information output devices such as a monitor display and a speaker and an operator can, for example, increases or decreases the number of the storage device(s) 300 or change the configuration of the storage device 300 by operating the management terminal 500.

In this embodiment as describe above, the first controller 100 and the second controller 200 are provided in the storage apparatus and have a redundant configuration; and if a failure occurs at one controller, the other controller can execute access from the host computer 400. Now, data transfer processing at normal time in the storage apparatus provided with the first controller 100 and the second controller 200 which have the redundant configuration will be explained.

For example, let us assume that a data read request is issued from the host computer 400 via the host controller 118 for the first controller 100. In this case, the I/O controller 119 for the first controller 100 reads data, for which the read request has been made, from the storage device 300 and caches the data in a cache memory for the first processor memory 130. Then, the host controller 118 transfers the data, which is cached in the cache memory, to the host computer 400. Regarding the data read request from the host computer 400, the same process as that for the first controller 100 applies to the second controller 200.

Moreover, let us assume that a data write request is issued from the host computer 400 via the host controller 118 for the first controller 100. The host controller 118 caches write data in the cache memory for the first processor memory 130. Then, the first processor 110 transfers the write data via the NTB 113 to the second processor, thereby mirroring the data between the first controller 100 and the second controller 200.

Then, the host controller 118 notifies the host computer 400 that processing for writing the write data has been determined. Furthermore, the I/O controller 119 writes the write data, which is cached in the cache memory for the first processor 130, to the storage device 300. Once the write data which is cached in the cache memory is written to the storage device 300, the data in the cache memory changes from dirty data too clean data.

Data is mirrored between the controllers as described above in the storage apparatus with the plurality of controllers having a redundant configuration. As a result, even if a failure occurs at one controller, the other controller can continue executing the data read/write processing requested by the host computer 400.

Next, the first processor memory 130 for the first controller 100 and the second processor memory 230 for the second controller 200 will be explained with reference to FIG. 3. Since the second processor memory 230 has the same configuration as that of the first processor memory 130, the first processor memory 130 will be taken and explained below as an example.

Figure 3:
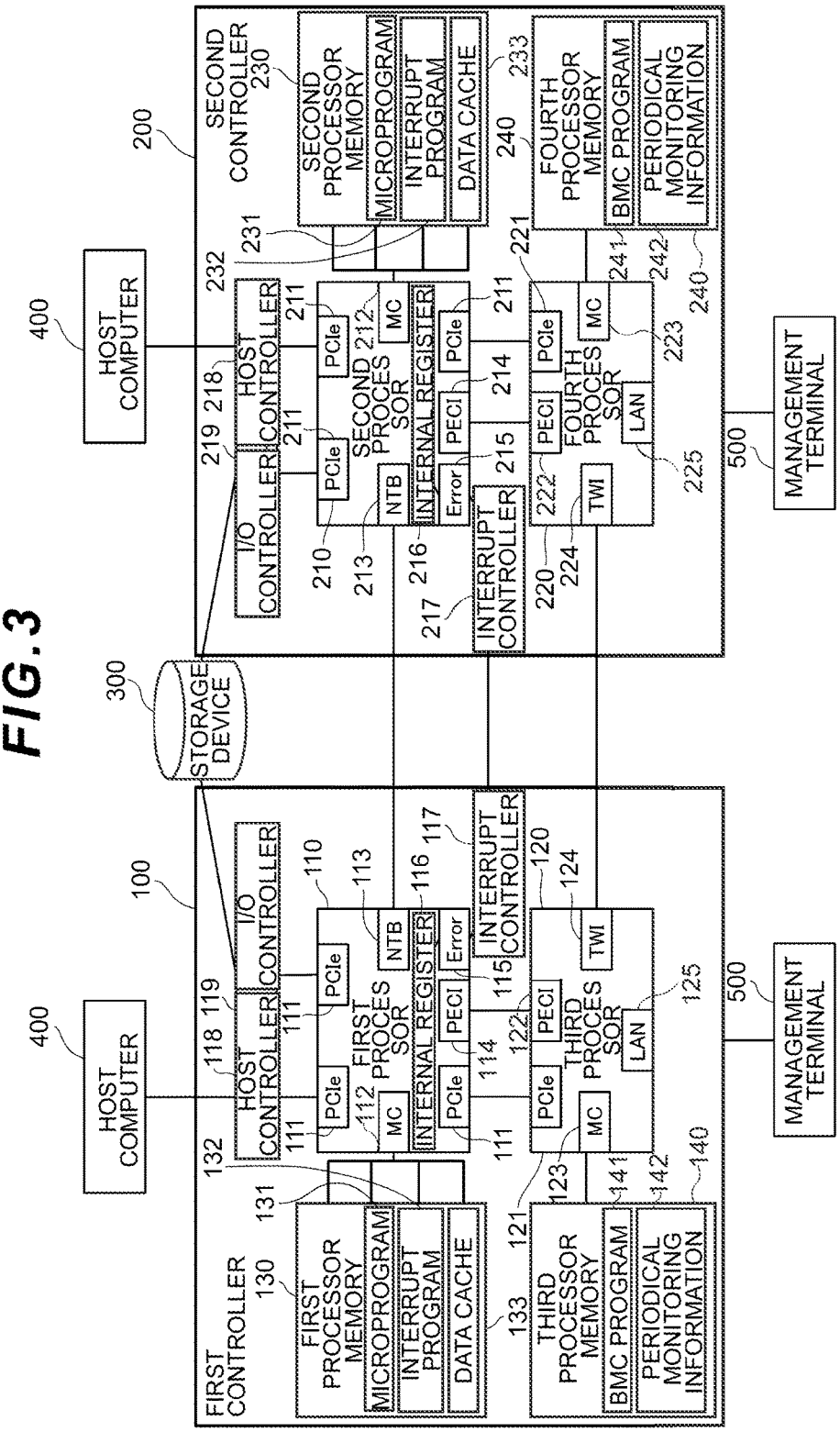
FIG. 3 is a block diagram showing a functional configuration of a storage apparatus according to the embodiment.

The first processor memory 130 mainly stores a microprogram 131 for I/O control of the first controller 100 and an interrupt program 132 for controlling interrupt processing at the time of the failure occurrence as illustrated in FIG. 3. Moreover, part of the first processor memory 130 is used as a data cache 133 for temporarily storing I/O data.

Furthermore, the third processor memory 140 mainly stores a BMC program 141 for controlling the environment of the first controller 100 and periodical monitoring information 142 that is information periodically monitored by the BMC program 141.

The first processor memory 130 is composed of a plurality of memories as described above; however, one of the plurality of memories stores a microprogram. For example, if a failure occurs at the memory which stores the microprogram 131, processing by the microprogram 131 cannot be executed and, therefore, it is possible that the failure location may not be identified or the failure processing may not be executed any longer. So, if a failure occurs on the first controller 100 side in this embodiment, the interrupt controller 117 issues interrupt processing for the failure processing to the microprogram 131 and notifies the interrupt controller 217 for the second controller 200 of the failure.

Then, the microprogram for the second controller 200 sends a failure information acquisition request to the third processor 120 for the first controller 100 via the TWI 124. Subsequently, the third processor for the first controller 100 acquires failure information inside the first processor 110 via the PECI 122. Then, the fourth processor 220 for the second controller 200 sends information about the identified failure location via the LAN 225 to the management terminal 500 and reports the failure location to the user.

(1-3) Details of Failure Processing

Next, the details of the failure processing at the storage apparatus will be explained. A case where a failure occurs at the first processor 110 or the first processor memory 130 for the first controller 100 will be explained below. In this embodiment, when a failure occurs on the first controller 100 side, an I/O path between the controllers is blocked and the failure identifying processing is executed at both the controllers, the first controller 100 and the second controller 200, in parallel as triggered by the occurrence of the failure. Then, when either the first controller 100 or the second controller 200 completes the failure specifying processing, the processing by the controller where the failure identifying processing is continued is stopped and the management terminal 500 is notified of the failure information.

When a failure occurs at the first processor 110 or the first processor memory 130, there is a possibility that the failure processing may not be operated normally on the first controller 100 side. However, the failure location can be identified promptly and with certainty by having not only the first controller 100, but also the second controller 200 which is normal and in which the failure has not occurred execute the failure processing in parallel as described in this embodiment.

Figure 4:
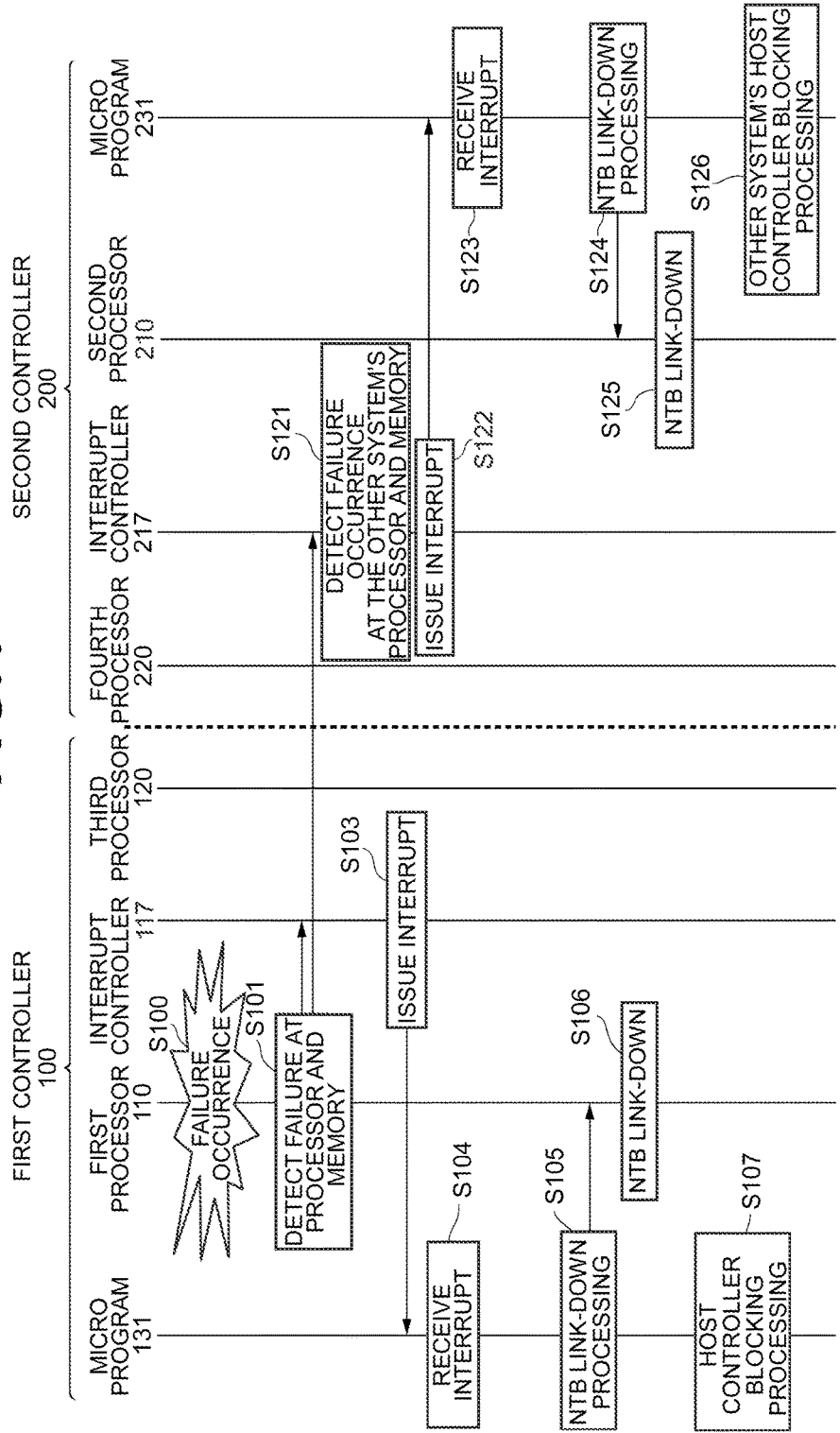
FIG. 4 is a flowchart illustrating the details of failure processing according to the embodiment.

Referring to FIG. 4, if a failure occurs on the first controller 100 side (S100), the first processor 110 detects an error of the first processor 110 or the first processor memory 130 and notifies the interrupt controller 117 and the interrupt controller 217 for the second controller 200 of the error (S101). When the first processor 110 detects the error of the first processor 110 or the first processor memory 130 in step S101, the first processor 110 reflects error information in the internal register 116.

Then, the error register 115 for the first processor 113 notifies the interrupt controller 117 of the error information and the interrupt controller 117 issues an interrupt to the microprogram 131 (S103).

When the microprogram 131 receives the interrupt issued from the interrupt controller 117, it loads an interrupt program from the first processor memory 130 and executes interrupt processing (S104).

Then, the microprogram 131 executes link-down processing on the NTB 113 which is a data path connecting the first processor 110 and the second processor 210 (S105). The NTB 113 enters a state of link-down and the data path between the first processor 110 and the second processor 210 is disconnected (S106).

Then, the microprogram 131 executes processing for blocking the host controller 118 for the first controller 100 and disconnects communication with the host computer 400 (S107).

Subsequently, the microprogram 131 acquires failure isolation data from the internal register 116 for the first processor 110 (S108). In step S108, the microprogram 131 acquires the failure isolation data and failure log data separately in order to prioritize identification of the failure location.

Now, the failure isolation data and the failure log data which are acquired in step S113 will be explained with reference to FIG. 6. If it takes time to make a failure isolation report to identify the failure location during the failure processing, the report to the management terminal 500 will be delayed. So, the data used to isolate the failure location and the log data to analyze a failure occurrence cause are acquired separately and the failure isolation data is acquired first. FIG. 6(A) shows an example of failure isolation data 610 and FIG. 6(B) shows an example of log data 620.

The failure isolation data 610 is a 4-byte error register acquired from the internal register 116 for the first processor 100. If 1 is stored in each bit of 4 bytes, it is determined that an error has occurred at a target location. As a result, the failure location can be isolated by identifying whether the failure location is the processor, the memory, or the data path.

Specifically speaking, as shown in FIG. 6(A), 24 to 31 bits of the failure isolation data 610 are error data in the CPUs and each bit corresponds to an error in various CPUs. If 1 is stored in any of 24 to 31 bits, it indicates that an error has occurred in the various CPUs corresponding to each bit. Moreover, 16 to 23 bits correspond to a PCIe port error. If 1 is stored in any of 16 to 23 bits, it indicates that an error has occurred at a port corresponding to each relevant bit. Furthermore, 8 to 15 bits and 0 to 7 bits are memory error data and each bit corresponds to a memory slot.

Furthermore, the failure log data 620 is acquired to analyze the cause of the failure occurrence and is, for example, dump data of all error registers in the first processor 110 and environment information (such as temperatures and voltages) inside the first controller 100. As illustrated in FIG. 6(B), 16 M bytes of 32 M bytes are dump data of the error registers inside the processor and the remaining 16 M bytes are dump data of the environment information.

Figure 5:
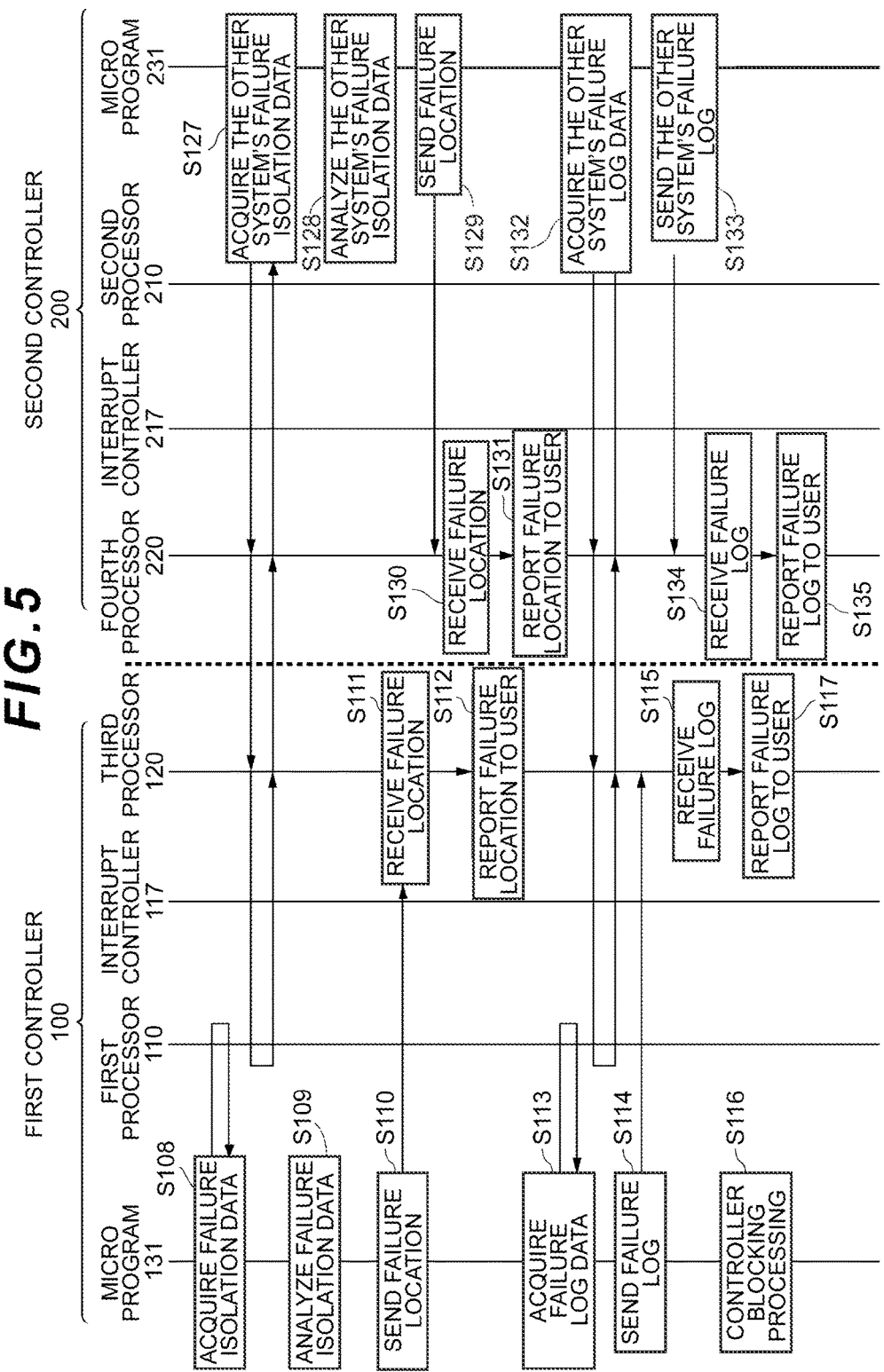
FIG. 5 is a flowchart illustrating the details of the failure processing according to the embodiment.

Referring back to FIG. 5, the microprogram 131 analyzes the failure isolation data acquired in step S108 in the first processor 110 and identifies the failure location (S109). The failure location identifying processing in step S109 may be executed by the BMC program in the third processor 120.

The microprogram 131 sends the failure location identified in step S109 to the third processor 120 (S110). The third processor 120 receives the failure location from the first processor 110 (S111) and reports the failure location to the user via the management terminal 500 (S112).

Moreover, the microprogram 131 acquires the aforementioned failure log data from the internal register 116 for the first processor 110 (S113) and sends the failure log acquired in step S113 to the third processor 120 (S114). Then, the microprogram 131 executes the blocking processing and blocks the first controller 100.

Furthermore, the third processor 120, to which the failure log was sent from the microprogram 131 in step S114, receives the failure log (S115), and reports the failure log to the user via the management terminal 500 (S117).

Incidentally, if the microprogram 131 does not operate normally, for example, in a case where an error has occurred in the first processor memory 130 where the microprogram 131 is stored, there is a possibility that the processing described above from step S104 to step S117 cannot be operated. In this embodiment, the failure processing in step S111 and subsequent steps is executed also in the second controller 200 in parallel with the first controller 100 as described earlier.

Specifically speaking, the interrupt controller 217 which was notified by the first processor 110 of the detection of the failure in step S101 detects the occurrence of the failure at the first processor 110 or the first processor memory 130 for the first controller 100 which is the other system (S121). Specifically speaking, the interrupt controller 217 for the second controller 200 detects error information of the first controller 100, which was reported from the interrupt controller 117 for the first controller 100.

Then, the interrupt controller 217 for the second controller 200 issues an interrupt to the microprogram 231 for the second controller 200 (S122).

After receiving the interrupt issued from the interrupt controller 217, the microprogram 231 loads the interrupt program from the second processor memory 230 and executes the interrupt processing (S123).

Then, the microprogram 231 executes the link-down processing on the NTB 212 which is a data path connecting the first processor 110 and the second processor 210 (S124). The NTB 212 enters a state of link-down and the data path between the first processor 110 and the second processor 210 is disconnected (S125).

Then, the microprogram 231 executes the blocking processing on the host controller 118 for the first controller 100 and disconnects communication with the host computer 400 (S126). As a result, it is possible to make the host computer 400 recognize that the first controller 100 cannot execute processing normally.

Subsequently, the microprogram 231 acquires the failure isolation data from the internal register 116 for the first processor 110 (S127).

Now, the processing for acquiring the failure isolation data from the controller of the other system in step S127 will be explained with reference to FIG. 7. The storage apparatus has a function acquiring the failure information from the processor in which the failure has not occurred, without being influenced by the failure of the processor in which the failure has occurred. That function can be realized by providing each controller with another processor (BMC) having an interface (PECI), which is capable of acquiring internal information of the processor, and connecting the relevant processor (BMC) via a second bus.

Figure 7:
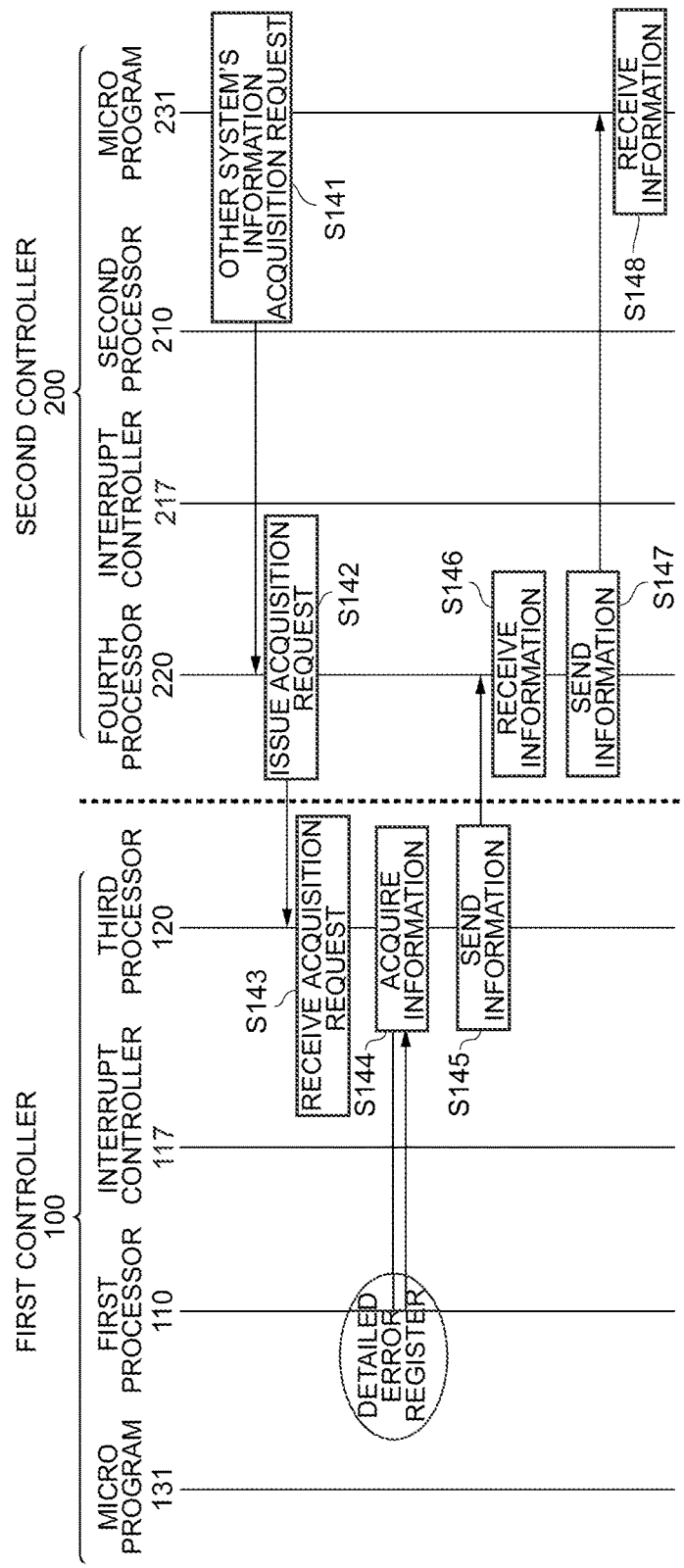
FIG. 7 is a flowchart illustrating failure isolation data acquisition processing according to the embodiment.

Referring to FIG. 7, a case in which the second controller 200 acquires the failure information about the first controller will be explained.

As illustrated in FIG. 7, the microprogram 231 for the second controller 200 requests the fourth processor 220 to acquire the failure isolation data (S141). Then, the fourth processor 220 issues a request to the third processor 120 to acquire the failure isolation data (S142).

When the third processor 120 receives the failure information acquisition request from the fourth processor 220 (S143), it acquires the failure information from the internal register 116 for the first processor 110 (5144) and sends that information to the fourth processor 220 (S145).

The fourth processor 220 receives the failure information from the third processor 120 (S146) and sends that information to the microprogram 231 (S147). The microprogram 231 receives the failure information from the fourth processor 229 (S148).

Referring back to FIG. 5, the microprogram 231 analyzes the failure isolation data, which was acquired in step S127, in the second processor 110 and identifies the failure location (S128). The failure location identifying processing in step S128 may be executed by the BMC program in the fourth processor 220.

The microprogram 131 sends the failure location identified in step S128 to the fourth processor 220 (S129). The fourth processor 220 receives the failure location from the second processor 210 (3130) and reports the failure location to the user via the management terminal 500 (S131).

Moreover, the microprogram 231 acquires the aforementioned failure log data from the internal register 116 for the first processor 110 (S132) and sends the failure log acquired in step S122 to the fourth processor 220 (S133).

Furthermore, the fourth processor 220, to which the failure log was sent from the microprogram 231 in step S123, receives the failure log (S134) and reports the failure log to the user via the management terminal 500 (S135).

Now, processing for terminating the failure processing will be explained with reference to FIG. 8. For example, when the failure log is reported to the user on the first controller 100 side before the second controller 200 side, processing for reporting the failure log on the second controller 200 side is no longer necessary and, therefore, the failure processing on the second controller 200 side, that is, the interrupt is terminated.

Figure 8:
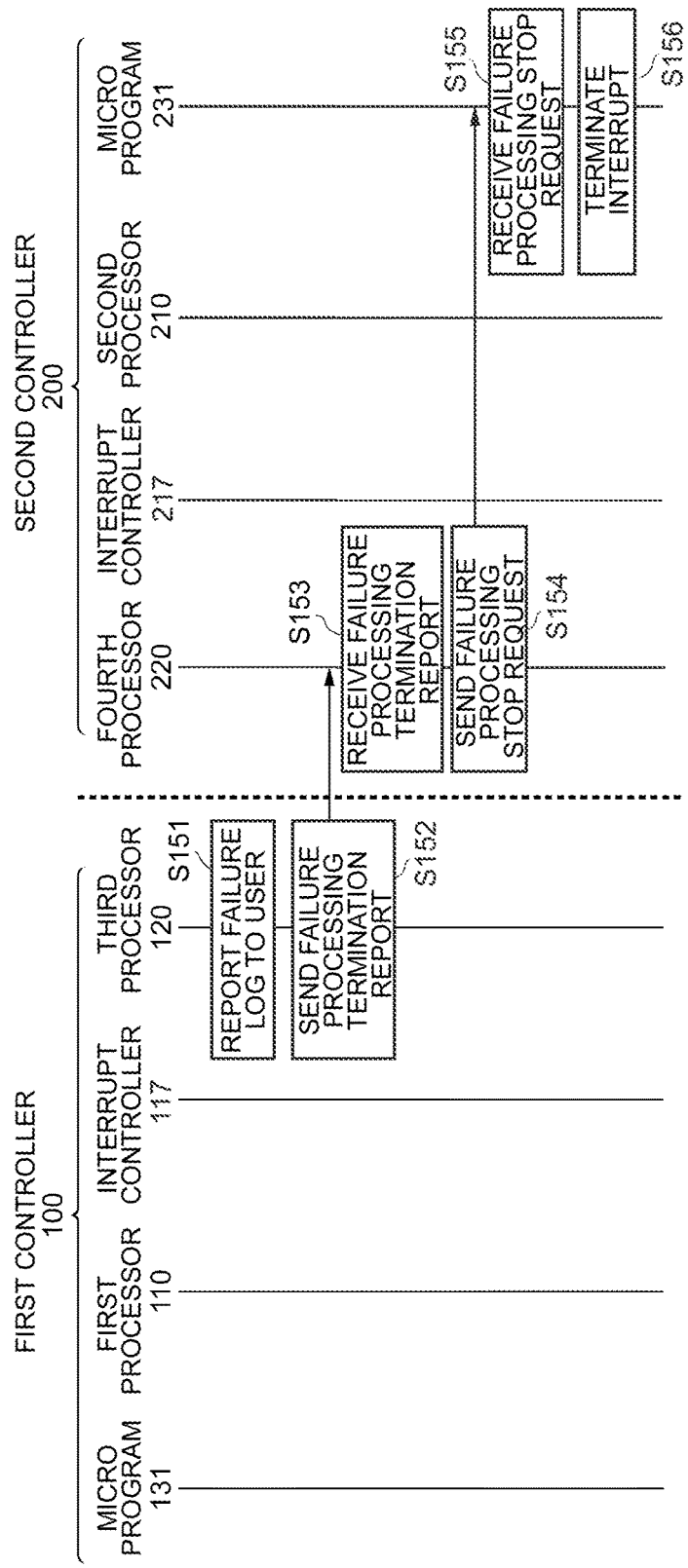
FIG. 8 is a flowchart illustrating processing for terminating the failure processing according to the embodiment.

When the third processor 120 reports the failure log to the user via the management terminal 500 (S151) as illustrated in FIG. 8, it sends termination of the failure processing to the fourth processor 220 (S152).

When the fourth processor 220 receives the failure processing termination report from the third processor 120 (S153), it sends a request to the microprogram 231 to stop the failure processing (S154). After receiving the failure processing stop request from the fourth processor 220 (S155), the microprogram 231 terminates the interrupt (S156).

As a result of the above-described processing, when both the controllers, the first controller 100 and the second controller 200, execute the failure processing, it is possible to prevent the management terminal 500 from receiving the failure report doubly from both the controllers.

(1-4) Advantageous Effects of this Embodiment

According to this embodiment described above, if a failure occurs at the first processor 110 or the first processor memory 130 for the first controller 100, the second controller 200 is notified of the occurrence of the failure, the I/O path between the controllers is blocked, and both the controllers, the first controller 100 and the second controller 200, execute the failure identifying processing in parallel with each other. Accordingly, even in a case where the failure identifying processing does not operate normally on the first controller 100 side, it is possible to identify the failure location promptly and with certainty by having not only the first controller 100 where the failure has occurred, but also the second controller 200 which is normal and in which the failure has not occurred execute the failure identifying processing in parallel.

(2) Second Embodiment (2-1) Outline of this Embodiment

The first embodiment described above is designed so that if a failure occurs at one processor or memory, the failure processing is executed, as triggered by the occurrence of the failure, not only on the controller side where the failure has occurred, but also the controller side which is normal and in which the failure has not occurred, in parallel with each other. This embodiment described below is designed so that when the failure processing is executed at the controller where the failure has occurred, and if the failure processing is not completed, the failure processing is executed at the normal controller where the failure has not occurred. Accordingly, it is possible to avoid the influence on I/O performance at the time of occurrence of the failure and identify the failure location with certainty by executing the failure processing at the controller where the failure has not occurred, only when the failure processing is not completed normally at the controller where the failure has occurred.

(2-2) Configuration of Computer System

Since the configuration of a computer system according to this embodiment is the same as the configuration of the computer system according to the first embodiment, any detailed explanation about it has been omitted.

(2-3) Details of Failure Processing

A case in which a failure has occurred at the first processor 110 or the first processor memory 130 for the first controller 100, like the case in the first embodiment, will be explained below. In the first embodiment, the failure identifying processing is executed at both the controllers, the first controller 100 and the second controller 200, in parallel with each other as triggered by the occurrence of the failure. The difference between this embodiment and the first embodiment is that in this embodiment, the second controller 200 in which the failure has not occurred executes the failure identifying processing when the failure identifying processing at the first controller 100 cannot be completed.

In this embodiment, the failure identifying processing executed on the first controller 100 side after the occurrence of a failure is the same as that of the first embodiment, so that its detailed explanation has been omitted. Moreover, the processing sequence executed, on the second controller 200 side after the occurrence of a failure, from the time when the occurrence of the failure at the first processor 110 or the first processor memory 130 for the first controller 100, which is the other system, is detected (step S121 in FIG. 4) to the processing for blocking the host controller 118 for the first controller 100 (step S126 in FIG. 4) is the same as that of the first embodiment, so that its detailed explanation has been omitted. In this embodiment, processing executed after the microprogram 231 for the second controller 200 blocks the host controller 118 for the first controller 100 in S126 is different, so that that processing will be explained with reference to FIG. 9.

Figure 9:
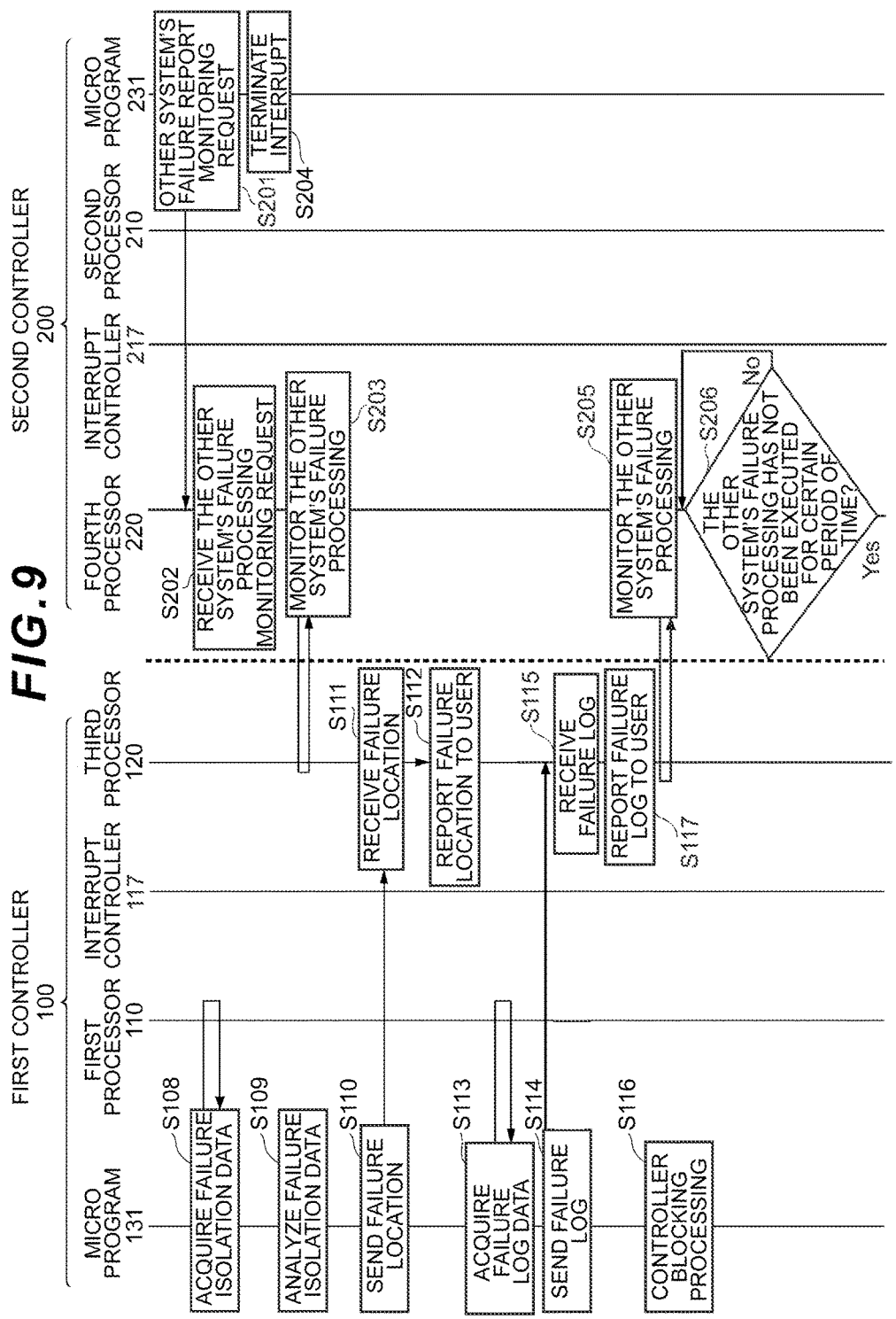
FIG. 9 is a flowchart illustrating the details of failure processing according to a second embodiment of the present invention.
Figure 10:
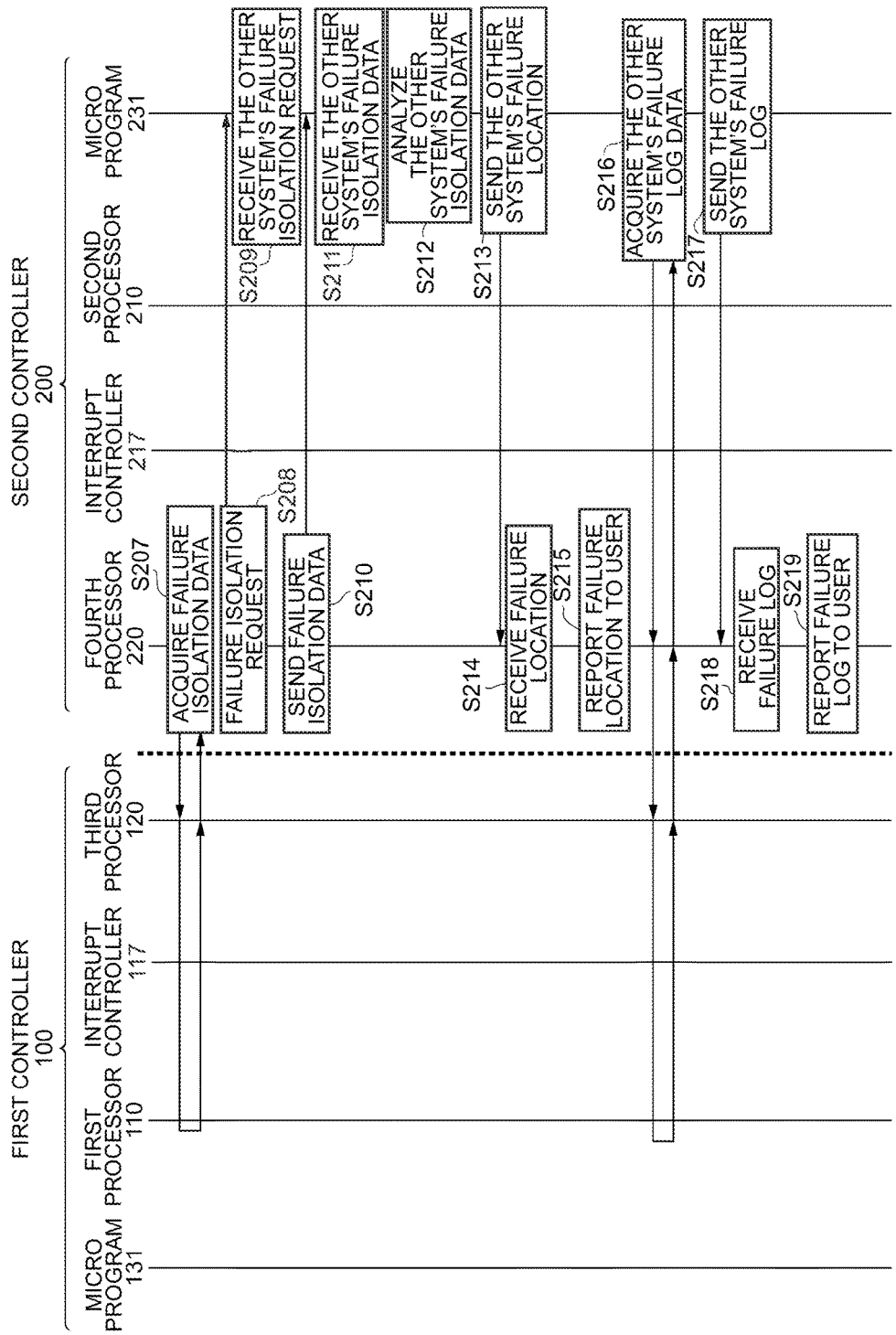
FIG. 10 is a flowchart illustrating the details of the failure processing according to the embodiment.

After the microprogram 231 for the second controller 200 blocks the host controller 118 for the first controller 100 in step S126, it notifies the fourth processor 220 of a monitoring request to monitor whether or not the failure information is reported to the user on the first controller 100 side (S201) as illustrated in FIG. 9. Subsequently, the microprogram 231 terminates the interrupt processing (S204) and executes normal I/O processing, that is, data read/write processing in response to a request from the host computer 400.

After receiving the monitoring request to monitor whether or not the failure information on the first controller 100 side is reported to the user, from the microprogram 231 (S202), the fourth processor 220 monitors the failure processing on the first controller 100 side (S203). Specifically speaking, the fourth processor 220 periodically acquires information about a report status of the failure information to the user from the third processor 120 for the first controller 100. The third processor 120 for the first controller 100 responds whether the failure information is reported to the user or not, in response to a report status request from the fourth processor 220.

The fourth processor 220 periodically executes the same monitoring processing as that in step S203 (S205); and after the elapse of a certain period of time, the fourth processor 220 judges whether or not the failure location or the failure log is reported to the user from the first controller 100 side (S206); and if the failure log is not reported, the fourth processor 220 executes processing in step S207 and subsequent steps. Accordingly, this embodiment is designed so that the fourth processor 220 monitors whether a failure is reported to the user on the first controller 100 side, in response to a request from the microprogram 231; and only when the failure is not reported, the second processor 210 executes the failure processing. Consequently, only when the first controller 100 fails to execute the failure identifying processing, the second processor 210 executes the failure identifying processing and the second processor can execute normal I/O processing until it executes the failure identifying processing.

The fourth processor 220 acquires the failure isolation data from the internal register 116 for the first processor 110 via the third processor 120 (S207). Since the processing for acquiring the failure isolation data of the other system in step S207 is the same processing as that in FIG. 7 according to the first embodiment, its detailed explanation has been omitted.

Then, the fourth processor 220 requests the microprogram 231 to analyze the failure isolation data acquired in step S207 (S208) and sends the failure isolation data (S210).

After receiving a request to analyze the failure isolation data received in step S209 (S209), the microprogram 231 suspends the normal I/O processing and executes the failure identifying processing, that is, the interrupt processing. Subsequently, the microprogram 231 receives the failure isolation data (S211). Then, the microprogram 231 analyzes the failure isolation data and identifies the failure location (S212). The failure location identifying processing in step S212 may be executed by the BMC program in the fourth processor 220.

The microprogram 231 sends the failure location identified in step S212 to the fourth processor 220 (S213). The fourth processor 220 receives the failure location from the second processor 210 (S214) and reports the failure location to the user via the management terminal 500 (S215).

Furthermore, the microprogram 231 acquires the aforementioned failure log data from the internal register 116 for the first processor 110 (S216) and sends the failure log acquired in step S122 to the fourth processor 220 (S217).

Furthermore, the fourth processor 220, to which the failure log was sent from the microprogram 231 in step S123, receives the failure log (3218) and reports the failure log to the user via the management terminal 500 (S219).

(2-4) Advantageous Effects of this Embodiment

This embodiment is designed as described above so that if a failure occurs at the first processor 110 or the first processor memory 130 for the first controller 100, the second controller 200 is notified of the occurrence of the failure; and after blocking the I/O path between the controllers, the failure identifying processing is executed on the first controller 100 side and the normal I/O processing is executed at the second controller 200. Then, only if the failure identifying processing is not completed on the first controller 100 side, the failure identifying processing is executed at the second controller 200. As a result, it is possible to avoid the influence on the I/O performance at the time of the occurrence of a failure and identify the failure location with certainty by executing the failure identifying processing at the second controller 200 which is normal and in which the failure has not occurred only when the failure processing is not completed normally at the controller in which the failure has occurred.

REFERENCE SIGNS LIST 100 first controller
110 first processor
120 third processor
130 first processor memory
140 third processor memory
200 second controller
210 second processor
220 fourth processor
230 second processor memory
240 fourth processor memory
300 storage device
400 host computer
500 management terminal

The invention claimed is:

1. A storage apparatus comprising a first controller and second controller, which have a redundant configuration equipped with a plurality of components, for controlling data input to and output from a storage device,
   wherein the first controller is provided with a first processor for controlling data input to and output from the storage device and a third processor for monitoring the first controller;
   wherein the second controller is provided with a second processor for controlling data input to and output from the storage device and a fourth processor for monitoring the second controller;
   wherein the first processor and the second processor are connected via a first path and the third processor and the fourth processor are connected via a second path;
   wherein the first processor and the second processor communicate with each other at normal time via the first path in response to a response from a host computer and execute processing for inputting and outputting data to and from the storage device;
   wherein if a failure occurs at the first controller, the second processor blocks the first path, acquires failure information including a failure location of the first controller via the third processor, the fourth processor, and the second path, executes first failure location identifying processing, and notifies a management terminal of the failure location;
   wherein if a failure occurs at the first controller, the first processor acquires the failure information and executes second failure location identifying processing in parallel with the first failure location identifying processing by the second processor; and when either the first failure location identifying processing or the second failure location identifying processing is completed, the first processor notifies the management terminal of the failure location;
   wherein the first controller includes a first interrupt controller for having the first processor suspend the processing for inputting and outputting data to and from the storage device at normal time and execute interrupt processing;
   wherein the second controller includes a second interrupt controller for having the second processor suspend the processing for inputting and outputting data to and from the storage device at normal time and execute the interrupt processing; and
   wherein if a failure occurs at the first controller,
   the first processor which has detected the failure notifies the first interrupt controller and the second interrupt controller of detection of the failure, and
   the first interrupt controller requests the first processor to execute processing for blocking the first path and the second failure location identifying processing and the second interrupt controller requests the second processor to execute the processing for blocking the first path and the first failure location identifying processing; and
   after the first processor or the second processor executes the processing for blocking the first path,
   the second processor sends a request for the failure information to the third processor, acquires the failure information from the fourth processor via the second path, and executes the first failure location identifying processing, and
   the first processor executes the second failure location identifying processing in parallel with the first failure location identifying processing by the second processor.

2. The storage apparatus according to claim 1, wherein when either the first failure location identifying processing or the second failure location identifying processing is completed and either the first controller or the second controller notifies the management terminal of the failure location, the failure location identifying processing at the first controller or the second controller which has not completed the failure location identifying processing is terminated.

3. The storage apparatus according to claim 1, wherein after a failure occurs at the first controller and the first path is blocked, the first processor acquires the failure information and executes the second failure location identifying processing in priority to the first failure location identifying processing; and
   if the second failure location identifying processing is not completed after the elapse of a specified period of time, the second processor executes the first failure location identifying processing.

4. The storage apparatus according to claim 3, wherein the first controller includes a first interrupt controller for having the first processor suspend the processing for inputting and outputting data to and from the storage device at normal time and execute interrupt processing;
   wherein the second controller includes a second interrupt controller for having the second processor suspend the processing for inputting and outputting data to and from the storage device at normal time and execute the interrupt processing; and
   wherein if a failure occurs at the first controller,
   the first processor which has detected the failure notifies the first interrupt controller and the second interrupt controller of detection of the failure, and
   the first interrupt controller requests the first processor to execute processing for blocking the first path and the second failure location identifying processing and the second interrupt controller requests the second processor to execute the processing for blocking the first path and the first failure location identifying processing; and after the first processor or the second processor executes the processing for blocking the first path, the second processor requests the fourth processor to monitor the second failure location identifying processing; and if the second failure location identifying processing is not completed after the elapse of a specified period of time, the second processor executes the first failure location identifying processing.

5. The storage apparatus according to claim 1, wherein the failure information includes failure isolation information for identifying the failure location and failure log data for analyzing a failure occurrence cause; and wherein if a failure occurs at the first controller, the third processor acquires the failure information stored in an internal register of the first processor.

6. The storage apparatus according to claim 1, wherein the first controller includes a first interrupt controller for having the first processor suspend the processing for inputting and outputting data to and from the storage device at normal time and execute interrupt processing;

wherein the second controller includes a second interrupt controller for having the second processor suspend the processing for inputting and outputting data to and from the storage device at normal time and execute the interrupt processing; and wherein if a failure occurs at the first controller, the first interrupt controller detects the failure information stored in an internal register of the first processor and notifies the second interrupt controller of the failure information.

7. A storage apparatus comprising a first controller and second controller, which have a redundant configuration equipped with a plurality of components, for controlling data input to and output from a storage device, wherein the first controller is provided with a first processor for controlling data input to and output from the storage device and a third processor for monitoring the first controller;

wherein the second controller is provided with a second processor for controlling data input to and output from the storage device and a fourth processor for monitoring the second controller;

wherein the first processor and the second processor are connected via a first path and the third processor and the fourth processor are connected via a second path;

wherein the first processor and the second processor communicate with each other at normal time via the first path in response to a response from a host computer and execute processing for inputting and outputting data to and from the storage device;

wherein if a failure occurs at the first controller, the second processor blocks the first path, acquires failure information including a failure location of the first controller via the third processor, the fourth processor, and the second path, executes first failure location identifying processing, and notifies a management terminal of the failure location;

wherein the first controller includes a first interrupt controller for having the first processor suspend the processing for inputting and outputting data to and from the storage device at normal time and execute interrupt processing;

wherein the second controller includes a second interrupt controller for having the second processor suspend the processing for inputting and outputting data to and from the storage device at normal time and execute the interrupt processing; and wherein if a failure occurs at the first controller, the first processor which has detected the failure notifies the first interrupt controller and the second interrupt controller of detection of the failure, and the first interrupt controller requests the first processor, and the second interrupt controller requests the second processor, to suspend the processing for inputting and outputting data to and from the storage device at normal time and execute the processing for blocking the first path and processing for blocking a third path between the first processor and the host computer.

8. A failure location identifying method for a storage apparatus including a first controller and second controller, which have a redundant configuration equipped with a plurality of components, for controlling data input to and output from a storage device, wherein the first controller is provided with a first processor for controlling data input to and output from the storage device and a third processor for monitoring the first controller;

wherein the second controller is provided with a second processor for controlling data input to and output from the storage device and a fourth processor for monitoring the second controller; and wherein the first processor and the second processor are connected via a first path and the third processor and the fourth processor are connected via a second path;

the failure location identifying method comprising:

a first step executed by the first processor and the second processor communicating with each other at normal time via the first path in response to a response from a host computer and executing processing for inputting and outputting data to and from the storage device;

a second step executed, if a failure occurs at the first controller, by the second processor blocking the first path by suspending the processing for inputting and outputting data to and from the storage device;

a third step executed by the second processor executing first failure location identifying processing for acquiring failure information including a failure location of the first controller via the third processor, the fourth processor, and the second path; and a fourth step executed by the second processor notifying a management terminal of the failure location identified by the first failure location identifying processing;

wherein if a failure occurs at the first controller, the first processor acquires the failure information and executes second failure location identifying processing in parallel with the first failure location identifying processing by the second processor; and when either the first failure location identifying processing or the second failure location identifying processing is completed, the first processor notifies the management terminal of the failure location;

wherein the first controller includes a first interrupt controller for having the first processor suspend the processing for inputting and outputting data to and from the storage device at normal time and execute interrupt processing;

wherein the second controller includes a second interrupt controller for having the second processor suspend the processing for inputting and outputting data to and from the storage device at normal time and execute the interrupt processing; and wherein if a failure occurs at the first controller,
the first processor which has detected the failure notifies the first interrupt controller and the second interrupt controller of detection of the failure, and
the first interrupt controller requests the first processor to execute processing for blocking the first path and the second failure location identifying processing and the second interrupt controller requests the second processor to execute the processing for blocking the first path and the first failure location identifying processing; and
after the first processor or the second processor executes the processing for blocking the first path,
the second processor sends a request for the failure information to the third processor, acquires the failure information from the fourth processor via the second path, and executes the first failure location identifying processing, and
the first processor executes the second failure location identifying processing in parallel with the first failure location identifying processing by the second processor.

* * * * *